United States Patent [19]

McLellan

[11] Patent Number: 5,127,789
[45] Date of Patent: Jul. 7, 1992

[54] APPARATUS FOR LOADING AND UNLOADING PALLETS

[75] Inventor: William McLellan, Stirling, Scotland

[73] Assignees: Cableflor Ltd., East Kilbride, Scotland; Bridon plc, South Yorkshire, England

[21] Appl. No.: 620,004

[22] Filed: Nov. 30, 1990

[30] Foreign Application Priority Data

Dec. 1, 1989 [GB] United Kingdom ............ 8927221

[51] Int. Cl.⁵ .............................................. B60P 3/00
[52] U.S. Cl. ................................. 414/512; 414/513; 414/514
[58] Field of Search ............ 414/509, 510, 512–517, 414/521, 679, 525.1, 325, 417

[56] References Cited

U.S. PATENT DOCUMENTS

| 2,902,180 | 9/1959 | Smith | 414/514 |
|---|---|---|---|
| 3,342,354 | 9/1967 | Behr | 414/521 |
| 3,642,154 | 2/1972 | Duszka | 414/525.1 X |
| 4,009,792 | 3/1977 | Sano et al. | 414/512 |
| 4,082,196 | 4/1978 | Lutz et al. | 414/521 |
| 4,111,318 | 9/1978 | Lutz | 414/521 |
| 4,113,125 | 9/1978 | Schiller | 414/512 X |
| 4,372,726 | 2/1983 | Lutz | 414/517 |
| 4,685,856 | 8/1987 | Hesse, Jr. | 414/521 X |
| 4,878,635 | 11/1989 | Nordstrom | 414/521 X |
| 4,984,756 | 1/1991 | Anders | 414/515 X |

FOREIGN PATENT DOCUMENTS

| 6166 | 3/1979 | Japan | 414/521 |
|---|---|---|---|
| 2041321 | 9/1980 | United Kingdom | 414/525.1 |
| 2191755 | 12/1987 | United Kingdom | 414/521 |
| 87/01996 | 4/1987 | World Int. Prop. O. | 414/521 |

Primary Examiner—David A. Bucci

[57] ABSTRACT

A loading and unloading system for pallets for containers or vehicles uses moving wire cables for loading. The system will guide and locate palletized goods on the moving wire cables. Downwardly extending members, such as wheels, on the pallets will be raised out of contact with the floor of the container or vehicle during conveying of the pallets.

20 Claims, 3 Drawing Sheets

APPARATUS FOR LOADING AND UNLOADING PALLETS

FIELD OF THE INVENTION

This invention relates to a loading and unloading apparatus for boxed or crated goods carried on pallets. The apparatus is particularly suitable for roll pallets for loading or unloading from a vehicle or container, ideally so that "automatic" loading and unloading of the container can take place at the pick-up point or the delivery point.

DESCRIPTION OF THE BACKGROUND ART

A roll pallet is a form of relatively large trolley mounted on wheels and generally has upstanding frame-like side members so that boxes or crated goods can be piled up on top of one another without falling off. Such roll pallets will, for the benefit of this specification, be referred to as "wheeled trolleys".

Wheeled trolleys are quite commonly encountered in the movement of goods between central warehouses and supermarkets and for shelf stocking. They are also in general use for handling and transporting mail bags.

The loading and unloading apparatus according to the invention is also suitable for conventional wooden pallets where the pallets have downwardly extending side portions or flanges along each edge as compared with pallets with flat under-surfaces. In fork-lift truck operations lifting and lowering is achieved by placing the fork underneath the pallet and between the downwardly extending side members. Such pallets, generally made from rough timber, may be loaded into containers by placing the downwardly extending edges or flanges of the pallet on a pair of moving belts spaced apart by the standard spacing of relatively narrow pallet flanges.

The friction between the moving track and the lower surface of the downwardly extending side walls conveys the pallet from one end of the container floor to the other. However, even in this case there is a location problem in that the side walls or flanges have to be located on the twin moving belt, in other words, the lower parts of the downwardly extending side walls have to be located directly on the moving belts and not so that the moving belts are between or outside the downwardly extending side walls.

Wheeled trolleys pose even more severe problems of guidance since it would be difficult, if not impossible, to position firstly the front wheels and then the rear wheels over the narrow moving belts which are spaced apart by the distance between each pair of wheels. Moreover, there is a maneuverability problem since wheeled trolleys of any kind may not proceed in a straight direction and may move to the left or right or traverse the container floor and are generally not easy to guide in a chosen direction.

Moving belt systems for loading and unloading boxed or crated goods are known in which the moving belt is attached to either side of the bulkhead. U.S. Pat. No. 4,111,318 to Lutz, relates to such a system which uses a number of wire cables as the moving belt, in this case a number of them extending along the vehicle or container floor or partly recessed therein. In addition, applicant's co-pending application GB 8908430.15 dated Apr. 14, 1989, relates to another form of cable conveyor more suitable for a transfer apparatus to be placed between the rear of the vehicle and the loading or unloading dock. Both the system in U.S. Pat. No. 4,111,318 and applicant's co-pending application utilize directly driven cables as the sole load carrying conveyor. Cables are not suitable for pushing loads.

In U.S. Pat. No. 4,111,318 a bulkhead is used which is moved by wire ropes attached to either side thereof and the cables are driven by winding up around drums. Thus, the bulkhead is drawn from a position at the loading end of the vehicle and movable up to the front end of the vehicle so as to protect the front wall of the container or the back section of the cab and the goods that may come into contact with the back section.

In U.S. Pat. No. 4,111,318 the bulkhead is returned for reloading by separate cables pulling it back to the loading position since cables will not function in compression and cable systems are not easy for operations where reversal of direction is required. The apparatus according to the present invention is not primarily driven by wire ropes and is therefore capable of carrying goods into and out of the container or vehicle.

SUMMARY OF THE INVENTION

An object of the present invention is to overcome the difficulties of loading pallets so that they are located on narrow moving belt conveyors and to provide a system being automatic in the sense that loading or unloading may be accomplished by one person operating hand held controls.

At the present time, loading and unloading pallets usually involves a number of employees pushing wheeled pallets off and on the floor of the container onto and from a fork-lift truck, giving rise to the possibility of damage to the goods and damage to the vehicle or container. Also, there is a possibility of injury caused by people getting trapped between trolleys, or between trolleys and the walls of the container or vehicle.

The time taken for loading and unloading operations can be significantly reduced by incorporating an "automatic" system with a single operator, which is particularly useful in setting down and picking up in busy supermarket sites or congested roadways.

However, the key problem is one of positioning the pallets onto the moving tracks so that any downwardly extending parts of the pallet are clear of the floor and to guide these pallets to the entry end of the track at the rear of the vehicle or container.

According to the present invention, an apparatus is provided for loading and unloading pallets respectively to and from the floor of a container or vehicle, the apparatus comprising a bulkhead driveable over the upper surface of the floor from one end to the other, at least two guides mounted on the floor extending in parallel relationship inwardly from the back end of the container, flexible element conveyor means between guides, the ends of each flexible element being attached to opposite sides of a bulkhead so as to be moved by the separately driven bulkhead, each flexible element conveyor running in a fixed track spaced apart from each of the guide means, and means to load and locate the pallets onto the flexible elements and to space the lower parts of the pallet from the floor in such a way that the lower downwardly extending members of the pallet are arranged to pass through the space between the guides and the fixed tracks.

The flexible means are preferably wire ropes or cables running in a suitably shaped recess formed along the fixed tracks so that the upper side of the cable is free to support the pallets.

Self-lubricating material may be provided on the part of the fixed track on either side or under the cable to reduce friction between the cable and the fixed track.

Preferably the means to load and locate the pallets to the wire rope conveyors at the loading end of the floor includes a converging entry channel piece formed between the guides and the fixed track so as to locate the pallets on the cables whereby the downwardly extending parts are clear of the fixed track.

Preferably, in order to bring the wire rope into contact with the under surface of the pallets between the downwardly extending parts, the pallet is lifted by passing up a ramp to maintain a clearance between the flanges and the floor of the vehicle.

The ramp may be formed in the leading section of the fixed tracks and extend inwardly from the back end of the vehicle or container whereby lifting of the pallets is accomplished during movement along the track and while being guided by the downwardly extending parts of the pallets passing into the convergent passage formed between the fixed tracks and the guide means.

In a preferred example, the downwardly extending parts of the pallets are trolley wheels which, together with the axle brackets by which they are mounted to the pallet, are guided into the convergent passage and the clearance space between the guidance means and the track.

As an alternative, the fixed track, together with the moving cable, can be raised with respect to the floor so as to bring the cable to contact the under surface of the pallet and lift to provide the required wheel clearance, but this is a far more complex and non-preferred system.

In a most preferred embodiment of the invention, there are preferably three bulkheads with a pair of fixed tracks for each bulkhead constituting a three row system of wheeled pallets so that typically there may be 15 wheeled pallets for each row, making a total load of 45 pallets. Such a system facilitates loading and unloading and enables, for example, the center lane to be unloaded before the outer lanes, or vice versa, and the center lane so vacated to be used for the reception of unloaded pallets which can be disassembled by removing the side frames.

A multiple system, as compared with a single bulkhead system, gives a much more planned approach to loading and unloading since in the single bulkhead system, the whole width of the container has to be loaded against the bulkhead and so on, until the bulkhead has reached the other end of the vehicle.

In a preferred embodiment of the invention the means for moving the bulkhead includes a chain extending along the floor of the container or vehicle between the fixed tracks, said chain being fixed at each end thereof to the floor and a motor-driven sprocket mounted on the bulkhead to engage the chain.

In a preferred arrangement of the bulkhead drive, idler sprockets are mounted on the bulkhead before and after the driven sprocket and are arranged so that the chain, although fixed at each end to the floor, is free to pass under one idler sprocket up and over the driven sprocket and down and under the other idler sprocket to from a driving loop. The driven sprocket in engagement with the chain drives and moves the bulkhead from one end to the other of the container.

Wire ropes which carry the pallets are attached to each end thereof to opposite sides of the bulkhead to form loops which pass around pulleys mounted at the ends of the fixed tracks in such a manner that the bulkhead driven by the sprocket along the chain pulls the wire ropes round the pulleys.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of example only by reference to the accompanying drawings which are given by way of illustration only, and thus are not limitative of the present invention, and in which.

DETAILED DESCRIPTION OF THE PREFERRED EMBODIMENTS

Figure 1:
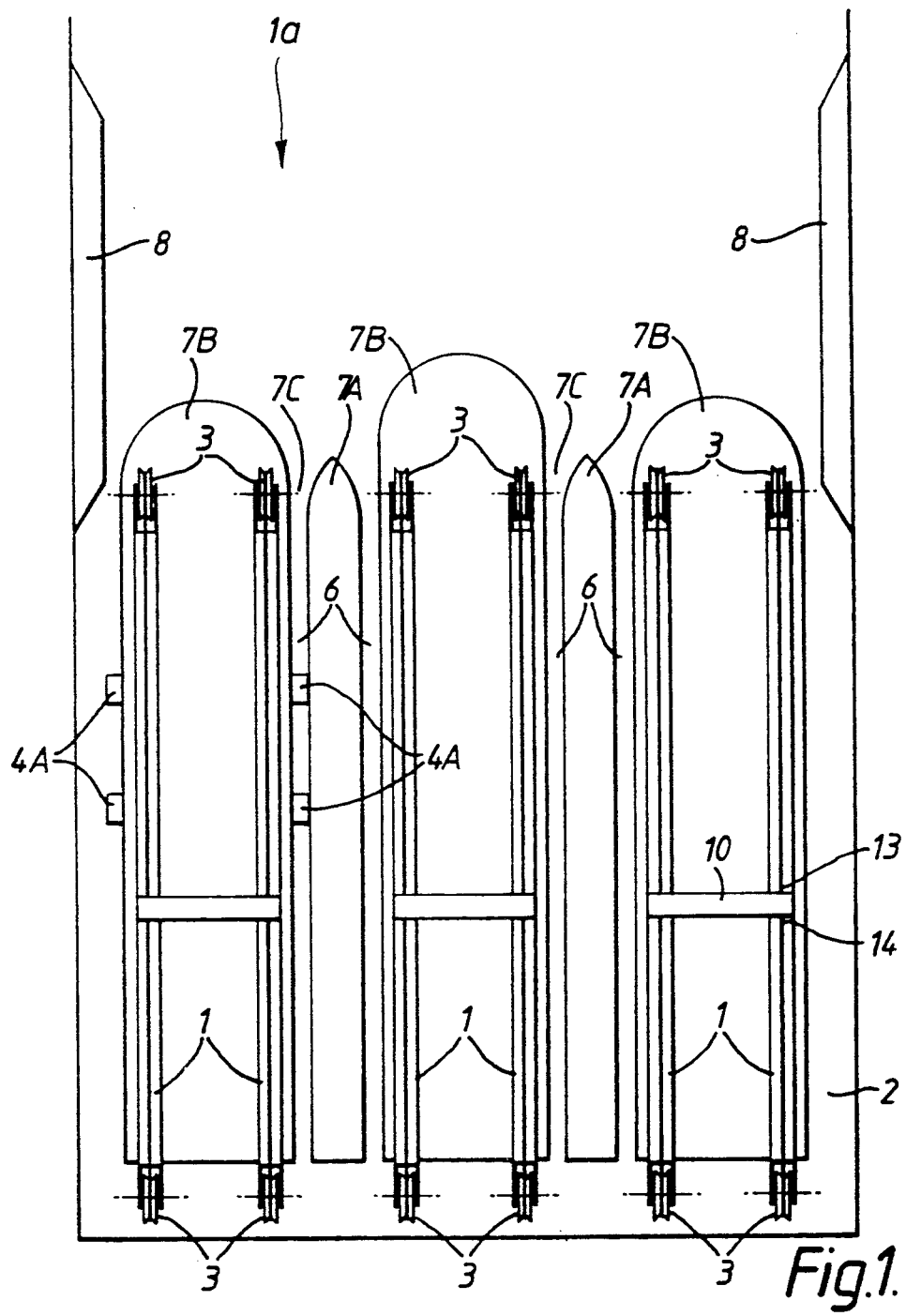
FIG. 1 shows a plan view of a three row loading and unloading system.

As shown in FIG. 1, a number of fixed tracks 1, in this case three twin tracks, are secured to a floor 2 of the vehicle or container. Pallets are loaded in the direction shown by arrow 1A. Idler pulleys 3 are provided at the end of the tracks. Wire cables 4 run in recesses 5 see FIG. 2, formed in the top surface of the tracks.

Figure 1A:
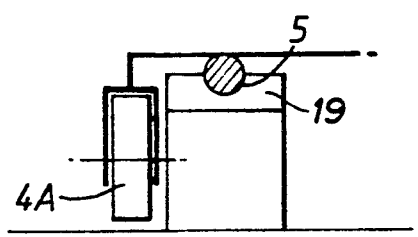
FIG. 1A shows a cross-section of the wire rope in the track recess and the upper part of the rope supporting the under surface of a pallet.

For a wheeled trolley the position of the wheels relative to the track 1 is shown by the single wheel 4A in FIG. 1A. For sake of clarity, the wire ropes 4 are shown diagrammatically in FIG. 1 but are also shown in part in FIG. 2 and FIG. 3. The wire ropes 4 pass around the idler pulleys 3 at the ends of the tracks. Channels 6 are formed between platforms 7A and 7B for guidance and centralizing the pallet wheel at the loading or entry end of the container. Converging passages 7C formed between the platforms 7A and 7B lead into the channels 6 and assist the pallets to align with the cables 4.

For a wheeled trolley, four wheels 4A are indicated for a single trolley correctly positioned on the track.

Clearly, with manual loading, the pallets, and more particularly their wheels, and wheel mountings or brackets, may not be in line at entry and converging passages 7C help to guide the wheels into the channels 6. The channels 6 may not extend all the way down the container towards the front end of the floor 2.

Protective shields 8 are provided at each side of the container for the two outer pairs of tracks to prevent damage to the container or the pallets or load, particularly if misdirected when loading or unloading. The cables 4 are joined at their ends 13,14 to bulkheads 12 as as shown in more detail with reference to FIG. 3.

Figure 2:
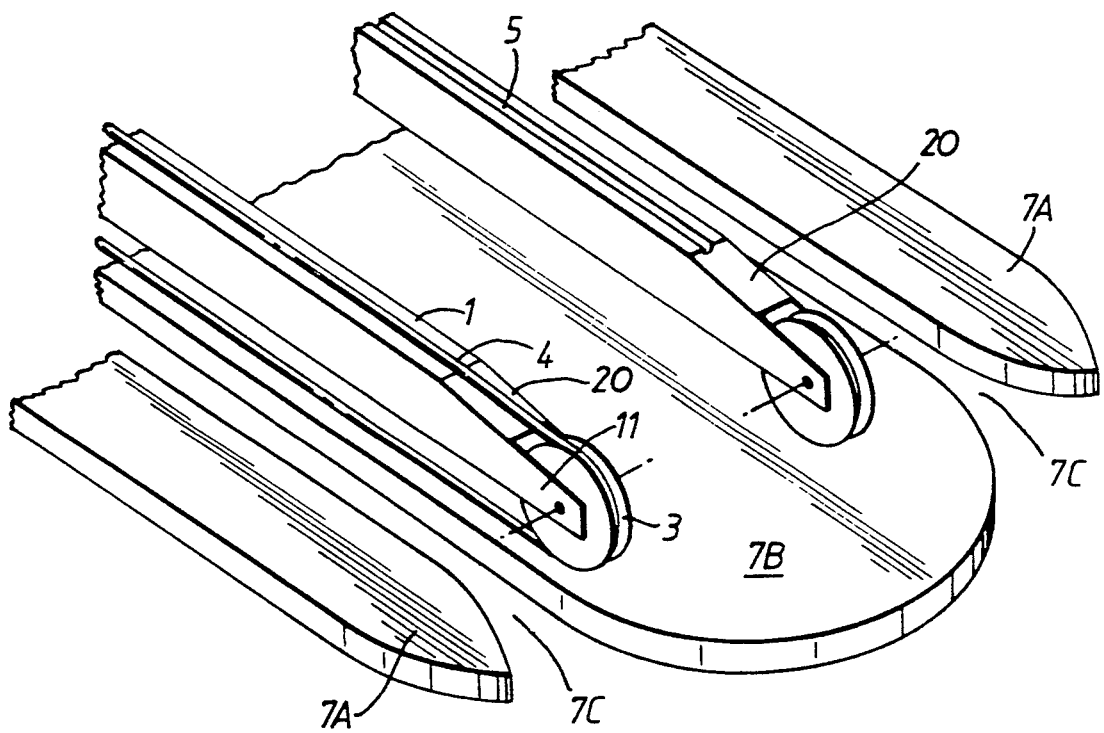
FIG. 2 shows a perspective view of the entry end of the system showing more clearly the pallet entry guidance system, the cables running in the fixed track and the means by which the wheeled pallets are raised from the floor of the container and loaded on the cables pallet lifting arrangements.

As will be seen more clearly in FIG. 2 the pulleys 3 on the fixed tracks 1 are mounted between pulley brackets 11 at the loading or unloading ends of the fixed tracks. The pulleys 3 are arranged so that the wire rope 4 passes up inclined ramps 20 at the entry end of the tracks before settling into the track recesses 5. Thus, the front wheels of the pallet are lifted away from the floor of the container, followed by the rear wheels and the undersurface of the pallet is carried along in contact with the upper surface of the ropes.

In addition, the diameter of the pulleys 3 at the loading end may be such that the rope 4 also inclines upwards to assist pallet lifting.

The front and rear wheels of the trolley need to lie one behind the other and this is assisted by the converging passages 7C created by the edges of the platforms 7A and 7B.

The wheeled pallets are wholly conveyed by the cables 3 supported by the tracks 1, and carried down to the front end of the vehicle until the bulkhead reaches the front of the vehicle. Subsequent wheeled containers are loaded on in sequence in rear to front relationship.

Figure 3:
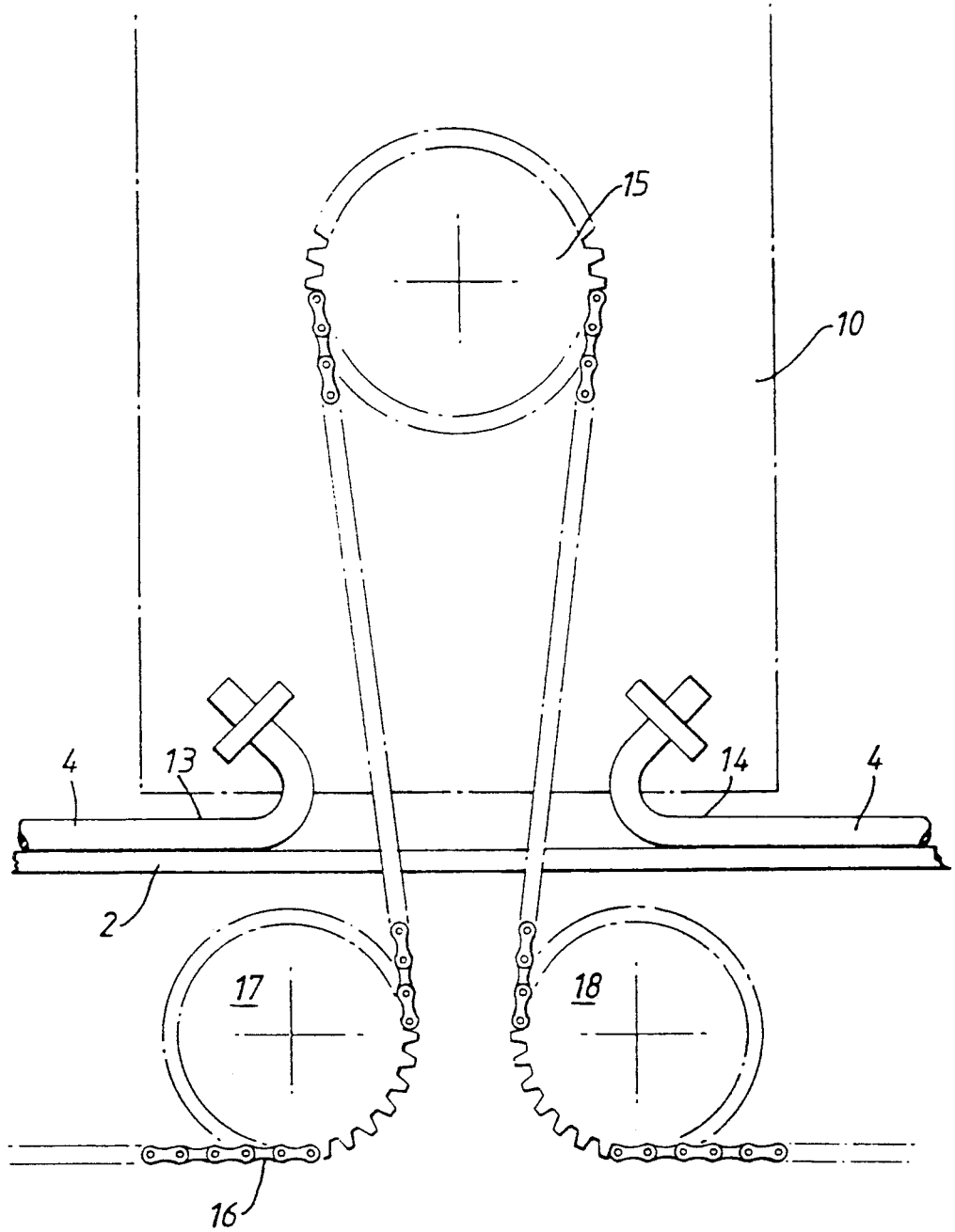
FIG. 3 shows very diagrammatically the bulkhead chains and sprocket drive and how the cables are pulled by the movement of the bulkhead.

As is shown very diagrammatically in FIG. 3, the cables 3 are anchored to box-like bulkheads 12 at their ends 13 and 14. A sprocket 15 driven by a reversible electric motor (not shown), is attached to the bulkhead 12. A chain 16 extends between the fixed tracks 1 from the front end of the vehicle to the rear and is firmly secured at each end to the floor (not shown). The chain 16 passes round a first idler sprocket 17 up and over the driven sprocket 15 and down and under a further idler sprocket 18. These sprockets 17 and 18 are moveable with the bulkhead 12. As seen in FIG. 3, these sprockets 17 and 18 are beneath floor 12. A slot (not shown) is provided so that these sprockets 17 and 18 can move along the length of the vehicle or container with the bulkhead 12. Thus, the bulkheads are driven by the sprocket 15 in either direction over the fixed tracks by engagement with the chain 16. It will be clear that movement of the bulkheads by the sprockets engaging in the chain will pull the cables 4 around the pulleys at each end of the fixed tracks.

The upper surface of the final tracks 1 including the recesses 5 may be formed from self-lubricating material 19, see FIG. 1A, to reduce the friction between the cable and the track.

Between each pair of tracks a tensioned wire rope fence (not shown) may be incorporated to reduce any tendency for the pallets or the load to tilt and foul the pallet or load on an adjacent track, whether during loading or unloading.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. An apparatus for loading and unloading pallets to and from a container, the container having a floor, a front end and a rear end, the pallets having downwardly extending members on a lower side thereof, the apparatus comprising:

at least one bulkhead movable over the floor between the front and rear ends of the container;

flexible element conveyor means for moving the pallets between the front and rear ends of the container, one conveyor means being provided for said at least one bulkhead and being attached thereto, the conveyor means being movable with the bulkhead;

fixed track means for guiding each conveyor means of each of the at least one bulkheads, each track means extending over the floor between the front and rear ends of the container;

channels on each side of each of the at least one bulkhead, the downwardly extending members of the pallets being received in the channels as the pallets are moved by the conveyor means; and means for raising the pallets to disengage the downwardly extending members from the floor as the conveyor means moves the pallets from the front end of the container toward the rear end thereof, bottoms of the downwardly extending members being raised out of contact with the channels by the means for raising.

2. The apparatus according to claim 1, further comprising means for guiding the downwardly extending members of the pallets into the channels on each side of the at least one bulkhead, the means for guiding being provided at a forward end of the channels at the front end of the container.

3. The apparatus according to claim 2, wherein the means for guiding comprises a platform with a curved forward section extending between each of the channels on the sides of the at least one bulkhead, the curved section camming the downwardly extending members of the pallets into the channels to guide the pallets onto the conveyor means.

4. The apparatus according to claim 3, wherein a plurality of bulkheads is provided, a separate channel being provided on each side of each bulkhead, the platform with the curved forward section being a first platform and a second platform being provided, the first platform being provided between the channels on each side of one bulkhead and the second platform being provided between channels for adjacent bulkheads, both the first and second platforms having curved forward sections for camming the downwardly extending members of the pallets into the channels.

5. The apparatus according to claim 4, wherein a distance between channels on each side of the bulkheads is greater than a distance between adjacent channels, and the forward ends of the first platforms are more gently curved than the forward ends of the second platforms.

6. The apparatus according to claim 5, wherein each of the forward ends of the first and second platforms is continuous.

7. The apparatus according to claim 1, further comprising means for guiding the downwardly extending members of the pallets into the channels on each side of the at least one bulkhead, the means for guiding comprising a platform with a continuous, curved forward section extending between each of the channels on the sides of the at least one bulkhead, the forward section camming the downwardly extending section of the pallets into the channels to guide the pallets onto the conveyor means.

8. The apparatus according to claim 7, wherein a plurality of bulkheads are provided and wherein the means for positioning further comprises a second platform positioned between channels of adjacent bulkheads, each of the second platforms having a continuous, curved forward section for camming the downwardly extending section of the pallets into the channels to guide the pallets onto the conveyor means.

9. The apparatus according to claim 1, wherein the means for raising comprises a ramp at a forward end of the track means, the pallets being lifted from the floor of the container as the conveyor means moves the pallets over the ramp toward the rear end of the container.

10. The apparatus according to claim 9, further comprising a pulley provided at the forward end of the track means, the conveyor means passing over the pulley and then over the ramp and then along the track means.

11. The apparatus according to claim 10, wherein the track means comprises a set of two tracks for each bulkhead, the set of tracks being provided between the channels on each side of the bulkhead.

12. The apparatus according to claim 11, wherein the conveyor means comprises one of wire ropes and cables on each of the tracks for each bulkhead.

13. The apparatus according to claim 1, wherein the track means comprises a set of two tracks for each bulkhead, the set of tracks being provided between the channels on each side of the bulkhead.

14. The apparatus according to claim 13, wherein the conveyor means comprises wire ropes on each of the tracks for each bulkhead, each track having a recess on an upper side thereof for receiving the wire rope and an underside of the pallets resting on an upper side of the wire rope so that the conveyor means supports the pallets during conveying of the pallets.

15. The apparatus according to claim 13, wherein the conveyor means comprises cables on each of the tracks for each bulkhead, each track having a recess on an upper side thereof for receiving the cable and an underside of the pallets resting on an upper side of the cable so that the conveyor means supports the pallets during conveying of the pallets.

16. The apparatus according to claim 1, further comprising self-lubricating material on the track means for reducing friction between the conveyor means and the track means.

17. The apparatus according to claim 1, wherein the downwardly extending members of the pallets are wheels and wherein the conveyor means comprises two side-by-side conveyors for each of the at least one bulkheads.

18. The apparatus according to claim 1, wherein the container is a vehicle and the apparatus further comprises protective shields on inner sides of the front end of the vehicle.

19. The apparatus according to claim 1, wherein three bulkheads are provided, each bulkhead having a channel so that a total of six channels are provided and each bulkhead having a track means, a conveyor means and a raising means associated therewith, each track means comprises two tracks, each conveyor means comprises a flexible belt on each track and each raising means comprises a ramp provided at a forward end of each track whereby two flexible belts and two ramps are provided for each bulkhead.

20. The apparatus according to claim 1, wherein each of the at least one bulkheads contains means for driving the bulkhead between the front end and the rear end of the container, the means for driving including a motor-driven sprocket and a chain extending between the ends of the container, the sprocket being engaged with the chain and being rotatable to move the bulkhead.

* * * * *